(12) United States Patent
Qin et al.

(10) Patent No.: US 6,324,202 B1
(45) Date of Patent: Nov. 27, 2001

(54) POWER EFFICIENT GAS ION LASER SYSTEM, ASSOCIATED LASER TUBE, AND METHOD

(75) Inventors: Yi Qin, Pleasanton; Geoffrey Lyle Randolph, Half Moon Bay, both of CA (US)

(73) Assignee: Uniphase Corporation, San Jose, CA (US)

( * ) Notice: Subject to any disclaimer, the term of this patent is extended or adjusted under 35 U.S.C. 154(b) by 0 days.

(21) Appl. No.: 09/144,787

(22) Filed: Sep. 1, 1998

(51) Int. Cl.⁷ .......................................................... H01S 3/03
(52) U.S. Cl. ............................... 372/61; 372/62; 372/103
(58) Field of Search .................................. 372/61, 62, 103

(56) References Cited

U.S. PATENT DOCUMENTS

| | | | |
|---|---|---|---|
| 4,385,390 | 5/1983 | McMahan | 372/63 |
| 4,477,907 | * 10/1984 | McMahan | 372/64 |
| 5,052,014 | 9/1991 | Hiroshima et al. | 372/103 |
| 5,386,434 | 1/1995 | Mandell et al. | 372/103 |

FOREIGN PATENT DOCUMENTS

| | | |
|---|---|---|
| 0535870 | 4/1993 | (EP) . |
| 0537032 | 4/1993 | (EP) . |
| 08181367 | 12/1996 | (JP) . |

* cited by examiner

Primary Examiner—Teresa M. Arroyo
Assistant Examiner—Jeffrey Zahn
(74) Attorney, Agent, or Firm—Michael Pritzkau

(57) ABSTRACT

A power efficient continuous wave gas ion laser system, associated laser tube and method are described. The system uses a fixed electrical input power and a power factor corrected power supply producing an output voltage and an output current from the fixed input electrical power. A gas ion laser tube is configured for use in the system having a particular cavity length which is established as a distance between a first mirror and a second mirror for operation using the output voltage and the output current. The system may be configured to provide a light output power improvement of approximately thirty percent over prior laser systems. In one feature, a laser tube is configured for providing the improved light output power in a conventional laser head configuration such that the laser tube may directly replace laser tubes in prior installations. Existing and new laser installations may benefit.

50 Claims, 2 Drawing Sheets

POWER EFFICIENT GAS ION LASER SYSTEM, ASSOCIATED LASER TUBE, AND METHOD

BACKGROUND OF THE INVENTION

The present invention relates generally to continuous wave gas ion lasers and more particularly to a power efficient continuous wave gas ion laser system and associated laser tube. The invention is particularly well suited for improving gas ion laser performance in the instance of a fixed level of available electrical input power. An associated method is also disclosed.

Continuous discharge gas ion lasers are relatively inefficient with regard to the use of electrical input power. It should be appreciated that, for this reason, the maximum light output power of such lasers has traditionally been limited, at least in part, by available electrical input power. For example, a typical 120 Volt AC electrical outlet in the United States is rated to provide approximately 17 amps on a continuous basis. As will be seen below, several considerations must be kept in mind when implementing a laser under such an input power constraint.

One factor which relates directly to input power limitations resides in the fact that the input current that is required to maintain a fixed light output from a gas ion laser tube increases in a known way as the tube ages. Hence, the lifetime of the tube is reached when the current drawn by the tube, via a typical laser power supply, meets or exceeds the level of current which is available from the source. In the example of a typical US 120 Volt AC outlet, for a nominal voltage of 106 VAC at a current of 17.3 amps (slightly above the recommended current limit), the end of life power consumption value of a laser tube is therefore just over 1,830 watts.

Based on a particular constraining value of input electrical power, it should be appreciated that the light output of a particular laser tube may be increased by driving the tube at higher current levels. However, the increase in output power, in this instance, is achieved by sacrificing a significant portion of the lifetime of the tube, as compared with driving the tube at a lower rated current level. In other words, by driving the tube at a current level which is higher than its rated level the end of life power consumption value will be reached in a proportionately shortened period of time.

The present invention discloses a system, laser tube and associated method which provide a highly advantageous improvement in output power in view of a particular constraining value of input electrical power or, alternatively, a highly advantageous improvement in laser tube lifetime.

SUMMARY OF THE INVENTION

As will be described in more detail hereinafter, a power efficient continuous wave gas ion laser system and associated laser tube are disclosed. An associated method is also disclosed. The system is configured for use with a fixed electrical input power and includes a power factor corrected power supply which produces an output voltage and an output current using the fixed input electrical power such that the output voltage and the output current are substantially in phase. A gas ion laser tube is configured for use in the system having a particular cavity length which is established as a distance between a first mirror and a second mirror for operation using the output voltage and the output current. The tube includes a bore arrangement positioned between the first and second mirrors and defining a laser bore having an active gain length in the range of approximately 25 percent to 35 percent of the cavity length.

In one aspect of the invention, the system may be configured to provide a light output power improvement of approximately thirty percent over prior art laser systems.

In accordance with one feature of the present invention, a laser tube is configured for providing the aforementioned improved light output power in a conventional laser head configuration such that the laser tube may directly replace laser tubes in prior art installations. In this manner, existing as well as new laser installations may benefit from the advantages of the present invention.

In accordance with another feature of the present invention, the improved laser tube of the present invention provides an operational lifetime which is equivalent to that of prior art laser tubes while still providing an output power which is significantly greater than the output power capability of prior art laser tubes operating using an identical fixed wattage source of input power. Alternatively, the improved output laser tube of the present invention may be operated in a manner which provides a light output level equivalent to that of a prior art laser tube operating at full light output capacity from an identical fixed wattage source of input power while, at the same time, providing an improved operational lifetime.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
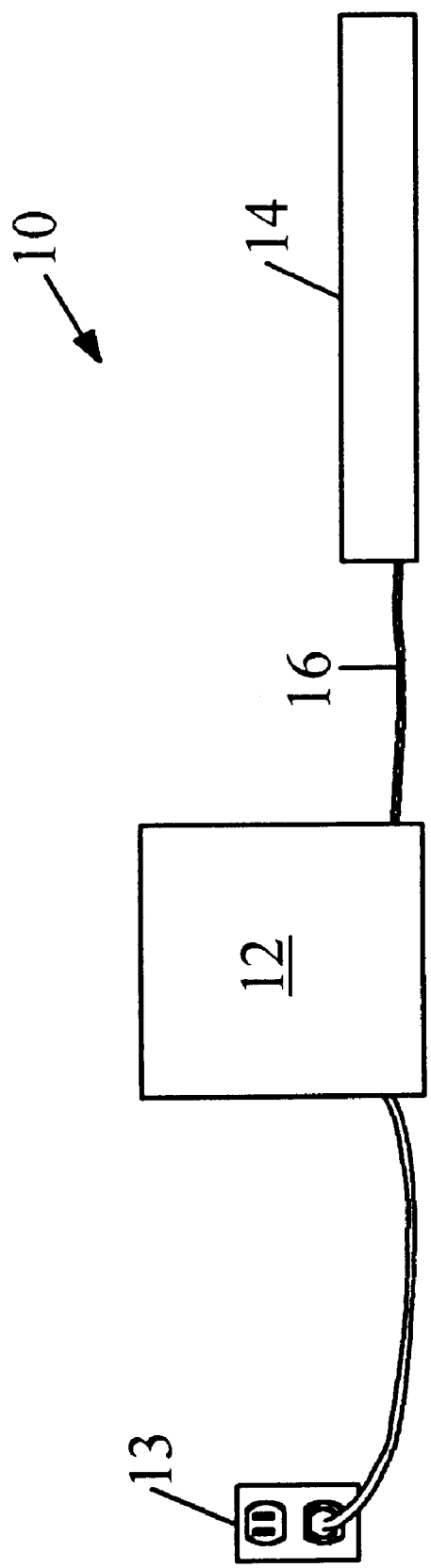
FIG. 1 is a diagrammatic elevational view of a continuous wave gas ion laser system manufactured in accordance with the present invention.

Attention is immediately directed to FIG. 1, which diagrammatically illustrates a continuous wave gas ion laser system manufactured in accordance with the present invention and generally indicated by the reference numeral 10. System 10 includes a switch mode power supply 12 which is supplied power from a standard AC power outlet 13. For example, in the U.S., the supplied power may comprise 120 volt AC, 60 Hz. As is the case with any standard outlet, the electrical power which is available from the outlet is limited by protection devices such as, for example, a fuse or a circuit breaker (neither of which is shown). In the present example, a limit of 20 amps is common with a maximum recommended continuous current draw of approximately 17 amps. Thus, any device operating from such an outlet is limited by a constraining value of available electrical input power which will be referred to hereinafter as $P_{lim}$. Power supply 12 provides power to a gas ion laser tube 14, which is manufactured in accordance with the teachings herein, through a power cable 16. As will be seen hereinafter, system 10 is configured in a highly advantageous way which provides performance capabilities which have not been seen heretofore in view of the limitations imposed by $P_{lim}$.

Figure 2:
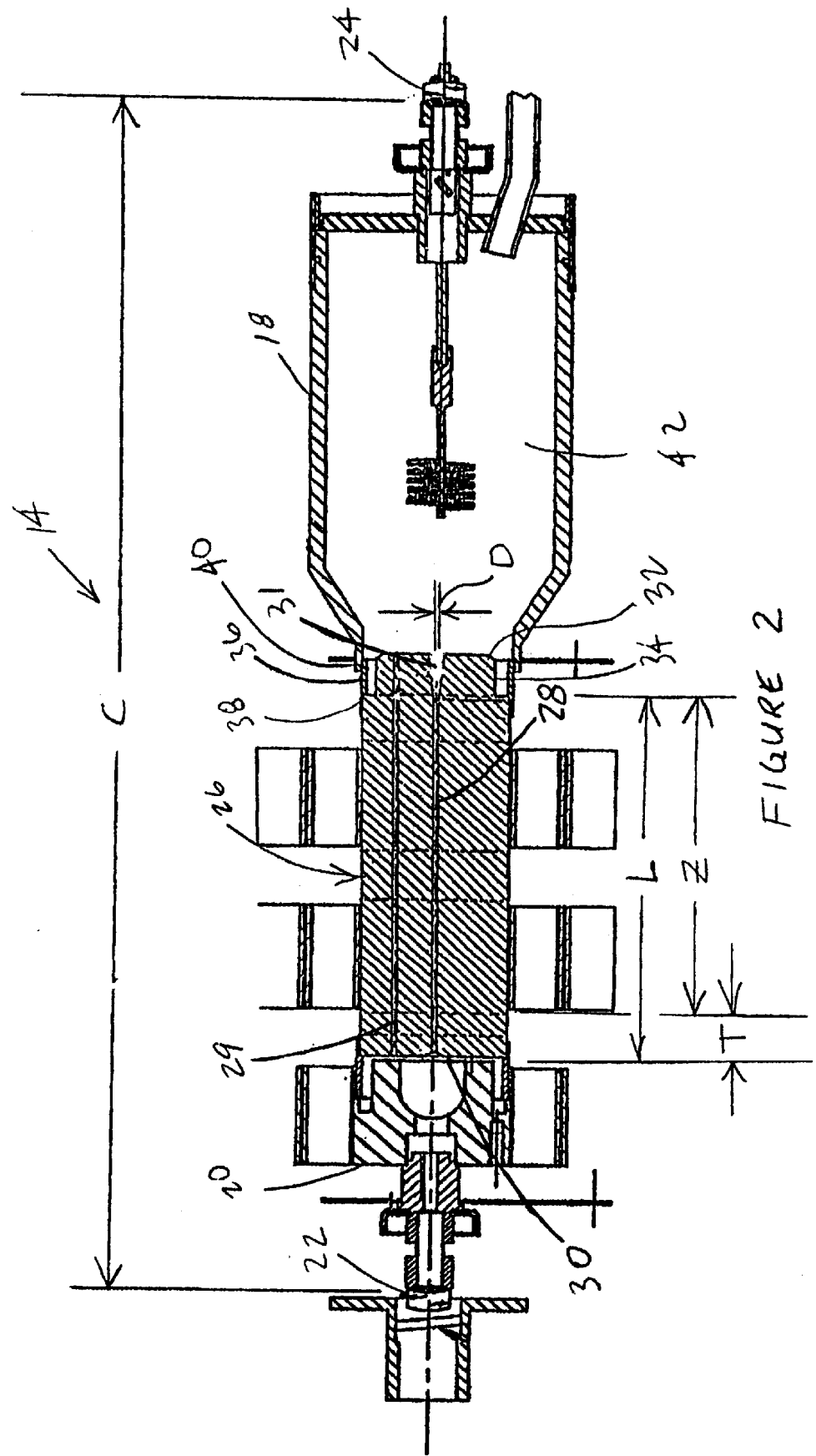
FIG. 2 is a diagrammatic cross-sectional view of a highly advantageous laser tube manufactured in accordance with the present invention.

Turning to FIG. 2 in conjunction with FIG. 1, specific details of the construction of gas ion laser tube 14 are illustrated. The latter includes a cathode housing 18 and an anode housing 20. First and second laser mirrors 22 and 24 are positioned within anode housing 20 and cathode housing 18, respectively. A laser bore arrangement 26 defines a bore 28. Bore arrangement 26 is constructed from suitable materials such as, for example, beryllium oxide. Bore 28 includes a length L and a diameter D. Laser bore arrangement 26 also defines a gas return channel 29 in a manner which is known in the art. As noted above, power is supplied to tube 14 by cable 16 which includes a positive lead (not shown) connected with anode arrangement 20 and a negative lead (not shown) connected with cathode arrangement 18. During steady state operation, a discharge is created within bore 28 that results in the production of light of one or more predetermined wavelengths which lase between mirrors 22 and 24 in a resonant cavity.

Having described the components which make up laser system 10 in a general way, basic considerations which govern the operation of the laser with respect to electrical power consumption will now be described. To that end, power supplied from AC outlet 13 to the laser system is defined as:

$$P = \frac{V_{DIS} \cdot I_{DC}}{E_{PS} \cdot PF_{PS}} \quad (1)$$

where P is the AC input power, $V_{DIS}$ is the discharge voltage of the laser tube, $I_{DC}$ is the DC tube current supplied by power supply 12 to the tube, $E_{PS}$ is the thermal electrical efficiency of the power supply and $PF_{PS}$ is the power factor of the power supply. In the prior art, switch mode power supplies are used which provide an $E_{PS}$ of approximately 0.9 (90%) and a $PF_{PS}$ of approximately 0.72 (72%). Assuming a conventional laser tube having an end of life current draw of 11.9 amps ($I_{DC}$) and a discharge voltage of 100 VDC ($V_{DIS}$), P is calculated as 1,836 watts which is approximately 17.3 amps (AC) at a nominal AC outlet voltage of 106 VAC. Thus, the light output power of the laser is constrained, as described above, to approximately 75–80 mW at 12 AMPs by the limited AC input electrical power. In contrast, the present invention advantageously recognizes a manner in which the performance of the system may be improved significantly with regard to either increasing output power or maintaining an equivalent output power while significantly lengthening the lifetime of a laser tube configured in accordance with the teachings herein. Moreover, with specific regard to the laser tube, these improvements may be advantageously provided in a conventional package outline, as will be described. It should be appreciated that a standard package outline allows for retrofit of many existing systems to the upgraded laser system manufactured in accordance with the present invention. Specific details regarding these advantages will be described immediately hereinafter.

Still referring to FIGS. 1 and 2, the present invention recognizes that laser performance can be improved by optimization of the variables of Equation 1 in a manner which has not been seen heretofore. Accordingly, switched mode power supply 12 is a power factor corrected power supply having an $E_{PS}$ of approximately 0.85 (85%) and a $PF_{PS}$ of approximately 0.99 (99%). One highly advantageous power supply which provides these operational values is disclosed in co-pending U.S. patent application Ser. No. 09/089,568, filed Jun. 6, 1998, entitled UNIVERSAL LASER POWER CONTROLLER IN A GAS ION LASER SYSTEM AND METHOD which is incorporated herein in its entirety by this reference. FIG. 3 of the subject U.S. application illustrates the various functional sections which may make up power supply pending 12.

It can be seen from equation 1 that when the values for $E_{PS}$=0.85 and $PF_{PS}$=0.99 are used in place of the typical prior art values, a significant advantage is realized to the extent that the amount of AC power drawn by the system can be decreased by approximately 30% for an equivalent amount of light output power. Or, stated in a slightly different way, the improved efficiency conserves 30% of the available AC input power. While conservation of 30% of the AC input power is significant, the present invention recognizes that this conserved power may be applied to a laser tube, resulting in higher light output. To that end, power supply 12 accomplishes application of the conserved power to the laser tube by an internal voltage boost of approximately 30%, thereby permitting the voltage supplied to tube 14 to be raised from the conventional value of 100 VDC to approximately 130 VDC. Based on the available voltage increase and the highly advantageous way in which tube 14 is designed, system 10 achieves significant advantages over prior art lasers operating under the identical input electrical power constraints, as will be seen hereinafter.

Referring to FIG. 2, as mentioned, laser tube 14 includes a package outline having predetermined dimensions which are common among various manufacturers. The overall package outline is referred to by those of skill in the art as a "head size". While it is true that a conventional gas ion laser tube could be "re-scaled" in a way which permits the tube to operate from power supply 12, it is recognized herein that such re-scaling is of limited utility since the resulting head size would be incompatible with current products. That is, such a tube could be used in new designs, but would be useless in replacing worn out tubes in existing systems. In short, an existing system could not benefit from the advantages disclosed herein in view of an incompatible head size. For these reasons, gas ion laser tube 14 of the present invention includes a conventional head size which incorporates increased gain so as to compensate for the capability of power supply 12 to increase drive voltage from 100 VDC to 130 VDC. Specifically, length L of bore 28 is increased relative to cavity length C of the tube such that the ratio of L to C is within the range of approximately 25% to 35%. In the instance of a 130 VDC anode to cathode voltage, an L to C ratio of approximately 30% is preferred. This represents a percentage increase of approximately 30% in the length of the laser bore, as compared with a standard prior art laser tube. It should be appreciated that in a conventional tube the L to C ratio is approximately 22%. In this manner, the current density in bore 28 remains approximately the same as in a conventional tube. However, the gain region is significantly longer. Because light output is proportional to the length of the gain region, an increase in light output power of approximately 30% results for the same current density. Since tube lifetime is directly dependent on current density, tube 14 of the present invention advantageously provides a 30% increase in output light power accompanied by the further advantage of sustaining the expected lifetime of the tube.

Still referring to FIG. 2, the manner in which the gain length of tube 14 is extended without an associated increase in cavity length (i.e., no change in head size) will now be described. More specifically, bore arrangement 26 differs from prior art bore arrangements in two important features. In a first feature, anode end 30 of bore 28 does not include a taper. In the prior art, capillaries were designed having a taper at the anode end for purposes of preventing bore erosion. In fact, Applicant is not aware of any prior art bore which is not tapered at both ends. Remarkably, it has been discovered that the anode end taper is not needed. That is, the anode end of the bore is not subject to erosion in the manner of the cathode end of the bore. Thus, bore arrangement 26 of the present invention includes a cathode end taper 31, but no taper is provided on the anode end of the bore. It should be noted that an active gain length Z, forming part of overall length L, does not include length T of cathode end taper 31 since a taper formed at either end of the bore does not contribute to the active length of the bore. Only the region of the bore having diameter D contributes as gain region due to the high current density confined within reduced diameter D. Thus, by eliminating the anode end taper in the laser bore, the present invention effectively lengthens the active gain length of the laser bore by a length T without the need to lengthen C, the tube's cavity length. In a typical laser tube, T is equal to approximately 0.40". In accordance with this feature alone, the bore length may be increased to at least 26 percent of cavity length C.

In accordance with a second feature of the bore arrangement of the present invention, tube 14 provides another highly advantageous manner for increasing bore length L without the need to change the head size of the laser tube. Specifically, laser tube 14 differs from prior art laser tubes with regard to the way in which bore arrangement 26 is received by cathode can 18. The bore arrangement includes a cathode end 32 which defines an inset step portion 34. A Kovar sleeve 36 is brazed or attached in a suitable manner to a region 38 of the bore immediately adjacent to inset step portion 34. The opposite end of the Kovar sleeve is, in turn, brazed or attached in a suitable manner to cathode can 18 in a region 40. It should be appreciated that the configuration of the cathode end of the bore arrangement (with inset step portion 34) allows extension of bore length L into a region 42 of the laser's resonant cavity, which is defined by cathode can 18, without interfering with the typical manner in which cathode can 18 is normally attached to bore arrangement 26. In this regard, Applicant is unaware of any prior art arrangement which permits extension of any portion of the length of the bore into the cathode can. In contrast, this second feature, like the first feature described above, permits extension of the bore without resorting to a change in the head size of the laser tube. In the illustrated configuration of FIG. 2, the bore length has been extended into the cathode can by approximately 7 millimeters or approximately 30% of cavity length C. However, it is submitted that the bore length may be extended into the cathode can by as much as 9 millimeters. Thus, in accordance with this feature alone, the bore length may be increased to up to 34 percent of cavity length L. In this regard, it should be noted that a portion of the active gain length of the laser bore i.e., having diameter D, may actually extend into cathode can cavity 42. It should be noted that the illustrated configuration for interconnecting cathode end 32 of bore 26 with cathode can 18 represents only one configuration out of a wide range of possible configurations and that all of these configurations are considered to be within the scope of the present invention provided only that a portion of the laser bore is positioned within that portion of the laser cavity defined by the cathode can.

It should be appreciated that the advantages provided by the present invention may be utilized in a manner which provides for a significant increase in tube lifetime, as opposed to higher light output. As described above, tube lifetime is directly proportional to the current density in the bore of the tube. Therefore, by reducing the current density in a particular tube, the lifetime of the tube will increase, but the light output power of the tube will decrease. Tube 14 of the present invention is highly advantageous for the reason that its increased gain length allows power supply 12 to drive the tube at a current level well below that of a conventional tube operating at full power while maintaining the same level of light output as a conventional tube operating at full rated capability from an identical input power source. Thus, under such reduced current density conditions, the lifetime of tube 14 of the present invention can be potentially extended up to 5,000 to 10,000 hours as compared to a conventional tube. Of course, this dramatic increase in tube lifetime is highly advantageous in reducing the frequency of tube replacement. Another advantage attends in reduced energy consumption. That is, for a particular level of light output as compared with a laser system of the prior art, electrical input power for the laser system of the present invention is reduced by the efficiency of power supply 12 in cooperation with the increased gain length of tube 14.

Since the laser system, laser tube and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A method of providing a modified gas ion laser system from an unmodified gas ion laser system each of which systems is configured for use with a fixed electrical input power, said method comprising the steps of:

a) providing a modified power supply having a particular power factor correction such that the modified power supply produces a given output power including an output voltage and an output current using said fixed input electrical power, which is substantially greater than an output power produced by an unmodified power supply without power factor correction and forming one part of said unmodified gas ion laser system;

b) configuring a modified gas ion laser tube having a particular fixed cavity length which is established as a distance between a first mirror and a second mirror for operation using said output voltage and said output current and which particular fixed cavity length is approximately equal to an unmodified cavity length of an unmodified laser tube forming part of said unmodified system; and c) defining a laser bore between the first and second mirrors including a bore length having a modified active gain length sufficiently longer, including an additional length above an unmodified bore length used in the unmodified system which unmodified bore length receives the output power of the unmodified power supply at a particular current density, to accommodate the given output power of the modified power supply at a current density that is approximately equal to or less, than said particular current density, said laser bore further including an anode end defining an anode end portion of the laser bore having a configuration which provides for active gain substantially therealong.

2. The method of claim 1 wherein said modified power supply provides said output voltage to said tube of approximately 130 VDC and wherein said modified active gain length, including said additional length, of the modified gas ion laser tube is approximately 30 percent of said fixed cavity length.

3. The method of claim 1 wherein a ratio of said modified active gain length to said cavity length is in the range of approximately 25 percent to 35 percent.

4. The method of claim 1 wherein said laser bore is defined to include a predetermined diameter which provides for active gain and wherein said anode end portion of the laser bore is formed including said predetermined diameter substantially throughout the extent of said anode end portion.

5. The method of claim 4 wherein said anode end portion is formed to define an opening confronting said first mirror and said opening includes an opening diameter which is substantially equal to said predetermined diameter.

6. A modified gas ion laser system for use with a fixed electrical input power produced from an unmodified gas ion laser system, each of which systems is configured for use with a fixed electrical input power, said modified system comprising:
   a) a modified power supply having a particular power factor correction such that the modified power supply produces a given output power including an output voltage and an output current using said fixed input electrical power, which is substantially greater than an output power produced by an unmodified power supply without power factor correction and forming one part of said unmodified gas ion laser system;
   b) a modified gas ion laser tube configured for operation using said output voltage and said output current, said modified gas ion laser tube including
      i) an anode end mirror and a cathode end mirror defining a particular fixed cavity length therebetween, and which particular fixed cavity length is approximately equal to an unmodified cavity length of an unmodified laser tube forming part of said unmodified system, and
      ii) means for defining a laser bore between the anode and cathode end mirrors including a bore length having a modified active gain length sufficiently longer, including an additional length above an unmodified bore length used in the unmodified system which unmodified bore length receives the output power of the unmodified power supply at a particular current density, to accommodate the given output power of the modified power supply at a current density that is approximately equal to or less than said particular current density, the bore defining means including an anode end defining an anode end portion of said laser bore, said anode end portion including at least a portion of said additional length such that the anode end portion of the laser bore provides active gain.

7. The system of claim 6 wherein said modified power supply provides said output voltage to said gas ion laser tube of approximately 130 VDC and wherein said modified active gain length of the modified gas ion laser tube is approximately 30 percent of said cavity length.

8. The system of claim 6 wherein a ratio of said active gain length to said cavity length is in the range of approximately 25 percent to 35 percent.

9. The system of claim 6 wherein said laser bore includes a predetermined diameter which provides for active gain and wherein said anode end portion of the laser bore includes said predetermined diameter substantially throughout the extent of said anode end portion.

10. The system of claim 9 wherein said anode end portion defines an opening confronting said anode end mirror and said opening includes an opening diameter which is substantially equal to said predetermined diameter.

11. The system of claim 9 wherein said anode end portion includes an opening confronting said anode end mirror and said opening includes an opening diameter which is substantially equal to said predetermined diameter.

12. A modified gas ion laser system for use with a fixed electrical input power produced from an unmodified gas ion laser system, each of which systems is configured for use with a fixed electrical input power, said modified system comprising:
   a) a modified power supply having a particular power factor correction such that the modified power supply produces a given output power including an output voltage and an output current using said fixed input electrical power, which is substantially greater than an output power produced by an unmodified power supply without power factor correction and forming one part of said unmodified gas ion laser system;
   b) a modified gas ion laser tube configured for operation using said output voltage and said output current, said modified gas ion laser tube including
      i) a cathode can defining a part of said laser cavity;
      ii) an anode end mirror and a cathode end mirror defining a particular fixed cavity length therebetween, which particular fixed cavity length is approximately equal to an unmodified cavity length of an unmodified laser tube forming part of said unmodified system, and
      iii) means for defining a laser bore between the anode and cathode end mirrors including a bore length having a modified active gain length sufficiently longer than an unmodified active gain length in the unmodified gas ion laser system, including an additional length above an unmodified bore length used in the unmodified system which unmodified bore length receives the output power of the unmodified power supply at a particular current density, to accommodate the given output power of the modified power supply at a current density that is approximately equal to or less than said particular current density, said bore defining means including a cathode end portion, and said bore defining means and said cathode can being assembled such that at least a portion of said cathode end portion is positioned within the part of the laser cavity defined by the cathode can.

13. The system of claim 12 wherein at least a portion of said active gain length of said laser bore is positioned within the part of the laser cavity defined by the cathode can.

14. The system of claim 12 wherein said cathode end portion is configured in a way intended to limit erosion of the cathode end due to operation of the laser tube.

15. The system of claim 14 wherein the laser bore in the cathode end portion includes a taper.

16. The system of claim 12 wherein the cathode can is attached to and cooperates with the bore defining means in a way which causes at least the cathode end portion to extend into the cathode can spaced apart therefrom.

17. The system of claim 16 wherein said bore defining means includes an outermost periphery having an outermost diameter and a peripheral inset step included as part of the outermost periphery to form an inset diameter, smaller than said outermost diameter, extending at least for a distance including the cathode end portion, to space at least the cathode end portion from the cathode can.

18. The system of claim 17 including an attachment sleeve having first and second ends designed to mate with the outermost diameter of the bore defining means and an opening defined by the cathode can, respectively, such the first end of the attachment sleeve is fixed to the outermost diameter of the bore defining means adjacent to said peripheral inset step and the second end of the attachment sleeve is fixed to the cathode can so that the cathode end portion is at least partially received through said opening.

19. In a gas ion laser tube including (i) a first mirror and a second mirror defining a cavity length therebetween and (ii) anode means associated with said first mirror and cathode means associated with said second mirror, the improvement comprising:

means positioned between said first and second mirrors for defining a laser bore including a bore length having an active gain length between the first and second mirrors including an anode end defining an anode end portion of said bore length and configured to provide active gain substantially throughout the extent of said anode end portion along said cavity length, and a cathode end defining a cathode end portion of said bore length and said cathode end portion including a configuration intended to prevent erosion of the cathode end due to operation of the laser tube.

20. The improvement according to claim 19 wherein the ratio of said active gain length to said cavity length is approximately 30 percent.

21. The improvement according to claim 19 wherein the active gain length of said laser bore includes a predetermined diameter which provides for active gain, and wherein said anode end defines said anode end portion of the laser bore including said predetermined diameter substantially throughout the extent of said anode end portion.

22. The improvement according to claim 21 wherein said anode end portion includes a surface confronting said first mirror which surface defines an opening leading into said anode end portion of said laser bore and said anode end opening includes an opening diameter leading into said laser bore which is substantially equal to said predetermined diameter of the laser bore.

23. The improvement according to claim 21 wherein said laser tube includes a cathode can for defining one part of said laser cavity and for supporting said second mirror and said cathode means, said bore defining means including a cathode end which defines a cathode end portion of said bore length having a cathode end entrance leading into said laser bore, said bore defining means and said cathode can being assembled such that the cathode end portion of the bore length is at least partially positioned within the part of the laser cavity as defined by the cathode can.

24. The improvement according to claim 23 wherein said cathode end portion includes a tapered configuration which is intended to limit erosion of the bore length.

25. The improvement of claim 24 wherein at least a portion of said active gain length of said laser bore is positioned within the part of the laser cavity defined by the cathode can.

26. The improvement of claim 19 wherein a ratio of said active gain length to said cavity length is in the range of approximately 25 percent to 35 percent.

27. The improvement of claim 19 wherein said laser bore includes a predetermined diameter which provides for active gain and wherein said anode end portion of the laser bore includes said predetermined diameter substantially throughout the extent of said anode end portion.

28. The improvement of claim 19 wherein the laser tube includes a cathode can supporting said cathode means and said second mirror and wherein the cathode can is attached to and cooperates with the bore defining means in a way which causes at least the cathode end portion to extend into the cathode can spaced apart therefrom.

29. The improvement of claim 28 wherein said bore defining means includes an outermost periphery having an outermost diameter and a peripheral inset step included as part of the outermost periphery to form an inset diameter, smaller than said outermost diameter, extending at least for a distance including the cathode end portion, to space at least the cathode end portion from the cathode can.

30. The improvement of claim 29 including an attachment sleeve having first and second ends designed to mate with the outermost diameter of the bore defining means and an opening defined by the cathode can, respectively, such the first end of the attachment sleeve is fixed to the outermost diameter of the bore defining means adjacent to said peripheral inset step and the second end of the attachment sleeve is fixed to the cathode can so that the cathode end portion is at least partially received through said opening.

31. A gas ion laser tube comprising:
a) a first mirror and a second mirror defining a cavity length therebetween;
b) means for defining a laser bore including an active gain length between the first and second mirrors including
  (i) an anode end defining an anode end portion of said bore length and configured to provide active gain substantially throughout the extent of said anode end portion along said cavity length, and
  (ii) a cathode end defining a cathode end portion of said bore length and said cathode end portion including a configuration for limiting erosion of the cathode end due to operation of the laser tube; and
c) anode means associated with said first mirror and cathode means associated with said second mirror for producing an electrical discharge therebetween and within said laser bore.

32. In a gas ion laser tube including (i) an input mirror and an output mirror defining a laser cavity having a fixed cavity length therebetween, (ii) anode means associated with said first mirror and cathode means associated with said second mirror, and (iii) means for defining a laser bore having an active gain length between said first and second mirrors, a method of extending the active gain length of said laser bore for said fixed cavity length, said method comprising the steps of:

a) forming said bore defining means having an anode end portion of said laser bore which terminates said laser bore nearest said anode means including a first configuration which provides for active gain along the anode end portion; and b) configuring said bore defining means having a cathode end portion of said laser bore which terminates said laser bore nearest said cathode means in a second configuration which is intended to limit erosion of the bore defining means.

33. The method of claim 32 further comprising the steps of:

c) defining one part of said laser cavity using a cathode can, said cathode can supporting said second mirror and said cathode means; and d) assembling said cathode can and said bore defining means such that at least the cathode end portion of said bore length, nearest said cathode means, is positioned within the part of the laser cavity defined by the cathode can.

34. The method of claim 18 wherein at least a portion of said active gain length of said laser bore is positioned within the part of the laser cavity defined by the cathode can.

35. The method of claim 32 wherein the step of forming the anode end portion is performed to provide a portion of the laser bore having a diameter sufficiently small to contribute active gain and the step of configuring the bore defining means further includes the step of tapering the cathode end portion.

36. The method of claim 32 including the step of tapering the cathode end portion.

37. The method of claim 32 wherein said laser tube includes a cathode can defining a part of said laser cavity and wherein said bore defining means is configured to include a cathode end portion, and assembling said bore defining means and said cathode can to position at least a portion of said cathode end portion within the part of the laser cavity defined by the cathode can.

38. The method of claim 37 including the step of attaching the cathode can to the bore defining means in a way that causes at least the cathode end portion to extend into the cathode can spaced apart therefrom.

39. The method of claim 38 wherein said bore defining means includes an outermost diameter and wherein said attaching step includes the step of forming a peripheral inset step around the bore defining means to form an inset diameter, smaller than said outermost diameter, to space at least the cathode end portion from the cathode can.

40. The method of claim 39 wherein said attaching step includes the steps of (i) providing an attachment sleeve having first and second ends designed to mate with the outermost diameter of the bore defining means and an opening defined by the cathode can, respectively, (ii) attaching the first end of the attachment sleeve to the outermost diameter of the bore defining means adjacent to said peripheral inset step, and (iii) attaching the second end of the attachment sleeve to the cathode can such that the cathode end portion of the bore defining means is at least partially received in the cathode can through said opening.

41. The method of claim 32 wherein a ratio of said active gain length to said cavity length is in the range of approximately 25 percent to 35 percent.

42. The method of claim 32 the anode end portion is formed including a configuration which provides for active gain substantially therealong.

43. The method of claim 42 wherein said laser bore is defined to include a predetermined diameter which provides for active gain and wherein said anode end portion of the laser bore is formed including said predetermined diameter substantially throughout the extent of said anode end portion.

44. The method of claim 43 wherein said anode end portion is formed to define an opening confronting said anode end mirror and said opening includes an opening diameter which is substantially equal to said predetermined diameter.

45. A method for providing a modified gas ion laser system from an unmodified gas ion laser system each of which systems is configured for use with a fixed electrical input power, said method comprising the steps of:

a) providing a modified power supply having a particular power factor correction such that the modified power supply produces a given output power including an output voltage and an output current using said fixed input electrical power, which is substantially greater than an output power produced by an unmodified power supply without power factor correction and forming one part of said unmodified gas ion laser system;

b) configuring a modified gas ion laser tube having a particular fixed cavity length which is established as a distance between a first mirror and a second mirror for operation using said output voltage and said output current and which particular fixed cavity length is approximately equal to an unmodified cavity length of an unmodified laser tube forming part of said unmodified system, said modified gas ion laser tube including a cathode can defining a part of said laser cavity;

c) defining a laser bore between the first and second mirrors including a bore length having a modified active gain length sufficiently longer, including an additional length above an unmodified bore length used in the unmodified system which unmodified bore length receives the output power of the unmodified power supply at a particular current density, to accommodate the given output power of the modified power supply at a current density that is approximately equal to or less than said particular current density said laser bore further including an anode end defining an anode end portion of the laser bore having a configuration which provides for active gain substantially therealong, and said laser bore configured to include a cathode end portion; and d) assembling said bore defining means and said cathode can to position at least a portion of said cathode end portion within the part of the laser cavity defined by the cathode can.

46. The method of claim 45 including the step of configuring said cathode end portion in a way that is intended to limit erosion of the cathode end due to operation of the gas ion laser tube.

47. The method of claim 46 including the step of tapering the cathode end portion.

48. The method of claim 45 including the step of attaching the cathode can to the bore defining means in a way that causes at least the cathode end portion to extend into the cathode can spaced apart therefrom.

49. The method of claim 48 wherein said bore defining means includes an outermost diameter and wherein said attaching step includes the step of forming a peripheral inset step around the bore defining means to form an inset diameter, smaller than said outermost diameter, to space at least the cathode end portion from the cathode can.

50. The method of claim 49 wherein said attaching step includes the steps of the (i) providing an attachment sleeve having first and second ends designed to mate with the outermost diameter of the bore defining means and an opening defined by the cathode can, respectively, (ii) attaching the first end of the attachment sleeve to the outermost diameter of the bore defining means adjacent to said peripheral inset step, and (iii) attaching the second end of the attachment sleeve to the cathode can such that the cathode end portion of the bore defining means is at least partially received in the cathode can through said opening.

* * * * *

UNITED STATES PATENT AND TRADEMARK OFFICE
CERTIFICATE OF CORRECTION

PATENT NO.   : 6,324,202 B1  
DATED        : November 27, 2001  
INVENTOR(S)  : Qin et al.

Page 1 of 1

It is certified that error appears in the above-identified patent and that said Letters Patent is hereby corrected as shown below:

<u>Column 6,</u>  
Line 51, after "longer" should read -- than an unmodified active gain length in the unmodified gas ion laser system --

<u>Column 7,</u>  
Line 38, after "longer" should read -- than an unmodified active gain length in the unmodified gas ion laser system --

Signed and Sealed this

Twenty-fifth Day of June, 2002

*Attest:*

*Attesting Officer*

JAMES E. ROGAN  
*Director of the United States Patent and Trademark Office*